US012323709B2

(12) United States Patent
Han et al.

(10) Patent No.: US 12,323,709 B2
(45) Date of Patent: Jun. 3, 2025

(54) ELECTRONIC DEVICE COMPRISING ROTATION MODULE AND METHOD OF OPERATING THE SAME

(71) Applicant: SAMSUNG ELECTRONICS CO., LTD., Suwon-si (KR)

(72) Inventors: Wooseung Han, Suwon-si (KR); Sangsik Park, Suwon-si (KR); Junghyuck Im, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 197 days.

(21) Appl. No.: 17/972,999

(22) Filed: Oct. 25, 2022

(65) Prior Publication Data

US 2023/0127190 A1  Apr. 27, 2023

Related U.S. Application Data

(63) Continuation of application No. PCT/KR2022/016232, filed on Oct. 24, 2022.

(30) Foreign Application Priority Data

Oct. 25, 2021 (KR) .......................... 10-2021-0142839

(51) Int. Cl.
*H04N 23/695* (2023.01)
*G06F 3/14* (2006.01)
(Continued)

(52) U.S. Cl.
CPC ......... *H04N 23/695* (2023.01); *G06F 3/1423* (2013.01); *H04N 23/62* (2023.01); *H04N 23/631* (2023.01)

(58) Field of Classification Search
CPC .... H04N 23/695; H04N 23/62; H04N 23/631; H04N 23/56; H04N 23/57; H04N 23/90; G06F 3/1423; G06F 3/147
See application file for complete search history.

(56) References Cited

U.S. PATENT DOCUMENTS 10,904,417 B1 * 1/2021 Saliev .................... H04N 23/74
11,196,908 B2   12/2021 Kang et al.
(Continued)

FOREIGN PATENT DOCUMENTS

JP   2004-040452      2/2004
JP   2004-260688 A    9/2004
(Continued)

OTHER PUBLICATIONS

PCT International Search Report dated Jan. 30, 2023 for PCT/KR2022/016232.
PCT Written Opinion dated Jan. 30, 2023 for PCT/KR2022/016232.

*Primary Examiner* — Christopher K Peterson
(74) *Attorney, Agent, or Firm* — Nixon & Vanderhye P.C.

(57) ABSTRACT

An electronic device may include a first display, a rotation module including a second display and a camera module which faces in a direction opposite to a direction in which the second display faces, a driving module configured to rotate the rotation module such that the second display faces in a first direction in which the first display faces or in a second direction opposite to the first direction, and at least one processor, wherein the at least one processor may be configured to display an execution screen of an application on the first display and the second display in the state in which the first display and the second display face in the first direction, based on a specified input, control the driving module such that the camera module faces in the first direction, and display, on the first display, an image obtained through the camera module in a state in which the camera module faces in the first direction.

10 Claims, 15 Drawing Sheets

(51) Int. Cl.
*H04N 23/62* (2023.01)
*H04N 23/63* (2023.01)

(56) References Cited

U.S. PATENT DOCUMENTS

| | | |
|---|---|---|
| 2002/0093584 A1 | 7/2002 | Lu |
| 2015/0062181 A1* | 3/2015 | Lee .................. G06F 1/1692 |
| | | 345/659 |
| 2021/0136291 A1 | 5/2021 | Chu et al. |
| 2021/0263552 A1 | 8/2021 | Kim et al. |
| 2022/0053075 A1 | 2/2022 | Ha et al. |
| 2022/0303473 A1 | 9/2022 | Sung et al. |

FOREIGN PATENT DOCUMENTS

| | | |
|---|---|---|
| JP | 2004-274404 A | 9/2004 |
| KR | 10-2006-0030669 A | 4/2006 |
| KR | 10-2006-0036756 A | 5/2006 |
| KR | 10-2015-0025616 | 3/2015 |
| KR | 10-2016-0085553 | 7/2016 |
| KR | 10-2020-0126735 A | 11/2020 |
| KR | 10-2020-0134436 | 12/2020 |
| KR | 10-2021-0072351 A | 6/2021 |

\* cited by examiner

ELECTRONIC DEVICE COMPRISING ROTATION MODULE AND METHOD OF OPERATING THE SAME

CROSS-REFERENCE TO RELATED APPLICATIONS

This application is a continuation of International Application No. PCT/KR2022/016232, designating the United States, filed on Oct. 24, 2022, in the Korean Intellectual Property Receiving Office and claiming priority to KR Patent Application No. 10-2021-0142839, filed on Oct. 25, 2021, the disclosures of which are incorporated by reference herein in their entireties.

BACKGROUND

Field

Various example embodiments of the present disclosure relate to an electronic device including a rotation module and a method of operating the same.

Description of Related Art

As carrying or use of electronic devices such as smartphones becomes common, users are demanding various appearances of electronic devices. For example, in consideration of portability and ease of use, there may be an increasing demand for an electronic device capable of providing a wider screen while being miniaturized.

In order to provide a wider screen, an electronic device that has a notch, a U-shaped hole, a V-shaped hole, or an O-shaped hole formed in a portion of a housing (or a portion of a display) and includes a camera module exposed to the outside through the formed notch or hole has been introduced. In addition, an electronic device having a camera module drawn out of the electronic device or inserted into the electronic device by a slide movement or a pop-up method has been released.

An electronic device including a camera module exposed to the outside through a notch or hole formed in a portion of a housing may have difficulty in employing a display having a screen display area substantially the same as the front area of the housing of the electronic device.

In addition, in an electronic device having a camera module that is taken out of the electronic device or inserted into the electronic device by a slide movement or pop-up method, there is a risk that the device for implementing the slide movement or pop-up method may be damaged, and foreign substances may be introduced into the electronic device while the camera module is being taken out or inserted into.

SUMMARY

Various example embodiments of the disclosure relate to an electronic device including a rotation module, which provides a sub-display that displays a wider screen along with a main display through a rotatable rotation module including a camera module and a sub-display facing in a direction opposite the direction of the camera module, and provides a camera module capable of operating as a front camera and a rear camera, and a method of operating the same.

The technical problems to be solved by the disclosure are not limited to the technical problems mentioned above, and other technical problems that are not mentioned may be clearly understood by those of ordinary skill in the art to which the disclosure belongs from the description below.

An electronic device according to various example embodiments of the disclosure may include a first display, a rotation module including a second display and a camera module which faces in a direction opposite to a direction in which the second display faces, a driving module configured to rotate the rotation module such that the second display faces in a first direction in which the first display faces or in a second direction opposite to the first direction, and at least one processor, wherein the at least one processor may be configured to display an execution screen of an application on the first display and the second display in a state in which the first display and the second display face in the first direction, based on a specified input, control the driving module such that the camera module faces in the first direction, and display, on the first display, an image obtained through the camera module in the state in which the camera module faces in the first direction.

A method of operating an electronic device according to various example embodiments of the disclosure may include displaying an execution screen of an application on a first display of the electronic device and on a second display included in a rotation module of the electronic device in a state in which the first display and the second display face in a first direction in which the first display faces, based on a specified input, controlling a driving module of the electronic device such that a camera module, which is included in the rotation module and faces in a direction opposite to a direction in which the second display faces, faces in the first direction, and displaying, on the first display, an image obtained through the camera module in a state in which the camera module faces in the first direction.

An electronic device including a rotation module and a method of operating the same, according to various example embodiments of the disclosure, can provide a sub-display that displays a wider screen along with a main display through a rotatable rotation module including a camera module and a sub-display facing in a direction opposite the direction of the camera module, and provide a camera module capable of operating as a front camera and a rear camera.

BRIEF DESCRIPTION OF THE DRAWINGS

The above and other aspects, features and advantages of certain an example embodiment will be more apparent from the following detailed description, taken in conjunction with the accompanying drawings.

DETAILED DESCRIPTION

Figure 1:
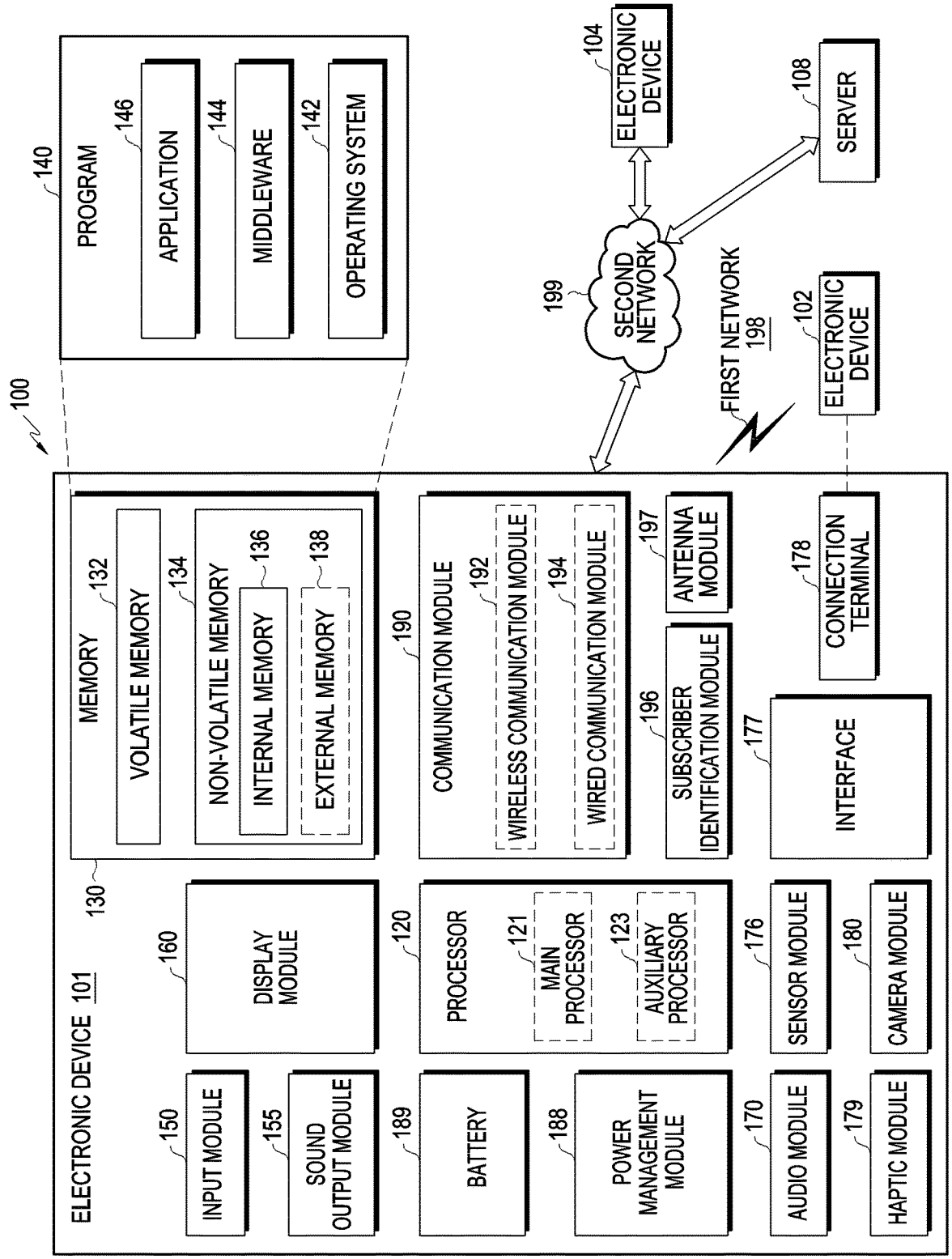
FIG. 1 is a block diagram of an electronic device in a network environment according to various example embodiments.

FIG. 1 is a block diagram illustrating an electronic device 101 in a network environment 100 according to various example embodiments.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence model is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
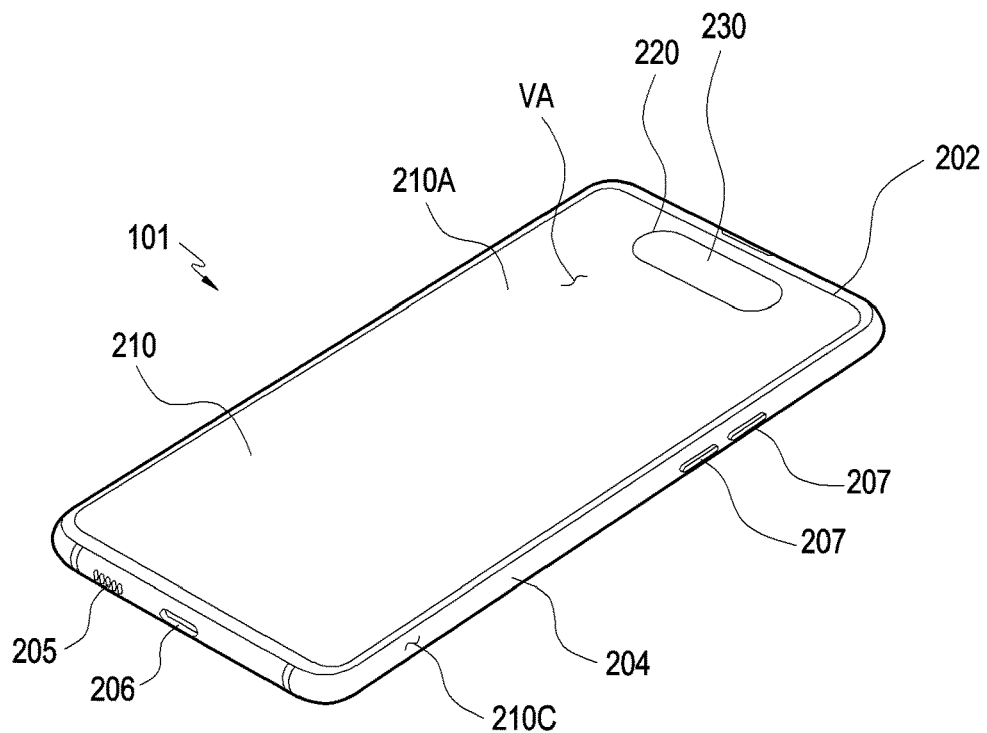
FIG. 2 is a perspective view illustrating a front surface of an electronic device according to various example embodiments.

FIG. 2 is a perspective view illustrating a front surface of an electronic device 101 according to various embodiments.

Figure 3:
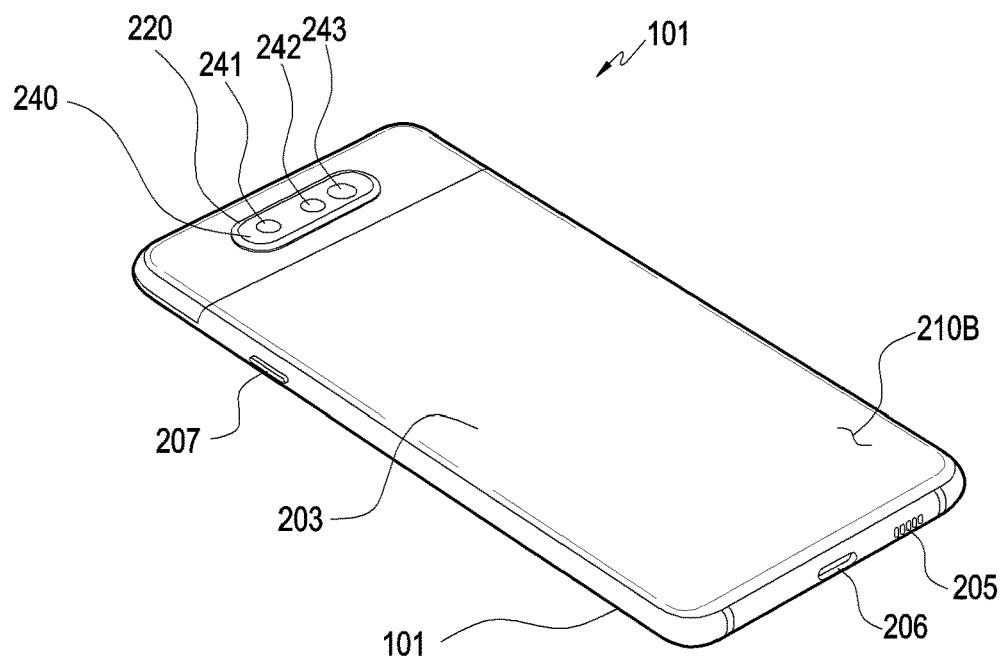
FIG. 3 is a perspective view illustrating a rear surface of an electronic device according to various example embodiments.

FIG. 3 is a perspective view illustrating a rear surface of an electronic device 101 according to various embodiments.

Referring to FIGS. 2 and 3, in an embodiment, an electronic device 101 may include a housing that includes a first surface 201A (also referred to as a "front surface"), a second surface 201B (also referred to as a "rear surface"), and side surface 201C (also referred to as a "sidewall") surrounding the space between the first surface 201A and the second surface 201B.

In one embodiment, the first surface 201A may be formed by a front plate 202 of which at least a portion is substantially transparent (e.g., a glass plate including various coating layers, or a polymer plate). In an embodiment, the front plate 202 may include a curved portion that extends seamlessly to be bent from at least one side edge portion of the first surface 201A toward a rear plate 203.

In an embodiment, the second surface 201B may be formed by a substantially opaque rear plate 203. The rear plate 203 may be formed of, for example, coated or colored glass, ceramic, polymer, metal (e.g., aluminum, stainless steel (STS), or magnesium), or a combination of at least two of the above materials. In an embodiment, the rear plate 203 may include a curved portion that extends seamlessly to be bent from at least one side edge portion of the second surface 201B toward the front plate 202.

In an embodiment, the side surface 201C may be coupled to the front plate 202 and the rear plate 203, and may be formed in a side structure (or "side member or sidewall") 204 including metal and/or polymer. In some embodiments, the rear plate 203 and the side structure 204 may be integrally formed and include the same material (e.g., a metal material such as aluminum).

In an embodiment, the electronic device 101 may include a first display 210, a rotation module 220, a driving module (e.g., the driving module 250 in FIG. 4), an audio module 205, a sensor module, and a key input device 207, and/or a connector hole 206. In an embodiment, the electronic device 101 may exclude at least one (e.g., the key input device 207) of the elements or further include other elements. For example, the electronic device 101 may include a sensor module that is not shown.

In an embodiment, the first display 210 may be exposed, for example, through a substantial portion of the front plate 202. In an embodiment, the edge of the first display 210 may be formed to be substantially the same as an outer shape of the front plate 202 adjacent thereto.

In an embodiment, in order to expand the exposed area of the first display 210, the distance between the outer edge of the first display 210 and the outer edge of the front plate 202 may be substantially uniform.

In an embodiment, an opening (also referred to as a "hole") may be formed in a portion of a vision area VA of the first display 210, and the rotation module 220 may be exposed through the opening. For example, a second display 230 or a camera module 240 included in the rotation module 220 may be exposed through the opening.

In an embodiment, the first display 210 may be connected to or disposed adjacent to a touch sensing circuit, a pressure sensor capable of measuring the intensity (pressure) of a touch, and/or a digitizer detecting a magnetic field type stylus pen.

In an embodiment, the rotation module 220 may include a second display 230 and a camera module 240.

In an embodiment, the second display 230 may display a screen through an opening formed on the front surface (e.g., an opening formed on the first display 210) or an opening formed on the rear surface (e.g., an opening formed on the rear plate 203). For example, the second display 230 may display the same content (e.g., one piece of content) as the first display 210 together with the same through the opening formed on the front surface in the state in which the second display 230 faces in the same direction (e.g., the direction in which the first display 210 outputs a screen) as the first display 210 (e.g., in the state in which the second display 230 is exposed through the front surface). As another example, the second display 230 may display content related to the application that is being executed in the electronic device 101 through the opening formed on the rear surface in the state in which the second display 230 faces in a direction opposite the direction in which the first display 210 faces. However, the content that the second display 230 is able to display is not limited to the content related to the application being executed in the electronic device 101, and the content displayable by the second display 230 will be described in detail later.

In an embodiment, although not shown in FIGS. 2 and 3, the rotation module 220 may further include a display driver integrated circuit (IC) for driving the second display 230. The display driver IC may communicate with a processor (e.g., the processor 120 in FIG. 1) through an interface (e.g., a display serial interface). When a control signal and/or data is received from the processor, the display driver IC may control the second display 230 to display the received data therethrough.

In an embodiment, the camera module 240 may include one or more cameras 241 and 243 and/or a flash 242 (also referred to as a "flash LED"). In an embodiment, camera module 240 may operate as a front camera or a rear camera. In an embodiment, the camera module 240 may operate as a front camera in the state in which the camera module 240 faces in the same direction as the direction in which the first display 210 faces. For example, the camera module 240 may photograph a subject located in the direction in which the first display 210 displays a screen in the state in which the camera module 240 faces in the same direction as the direction in which the first display 210 faces. In an embodiment, the camera module 240 may operate as a rear camera in the state in which camera module 240 faces in a direction opposite the direction in which the first display 210 faces. For example, the camera module 240 may photograph a subject located in the direction opposite the direction in which the first display 210 displays a screen in the state in which the camera module 240 faces in a direction opposite the direction in which the first display 210 faces. In an embodiment, the direction in which the camera module 240 faces may indicate the direction in which at least one camera 241 or 243 and/or the flash 242 included in the camera module 240 is directed for shooting or emitting light.

In an embodiment, the camera module 240 may further include one or more lenses, an image sensor, and/or an image signal processor. In an embodiment, the one or more cameras 241 and 243 included in the camera module 240 may include cameras having different angles of view (e.g., a camera including a wide-angle lens and a camera including a telephoto lens). In an embodiment, the flash 242 included in the camera module 240 may include a light-emitting diode or a xenon lamp.

Figure 5:
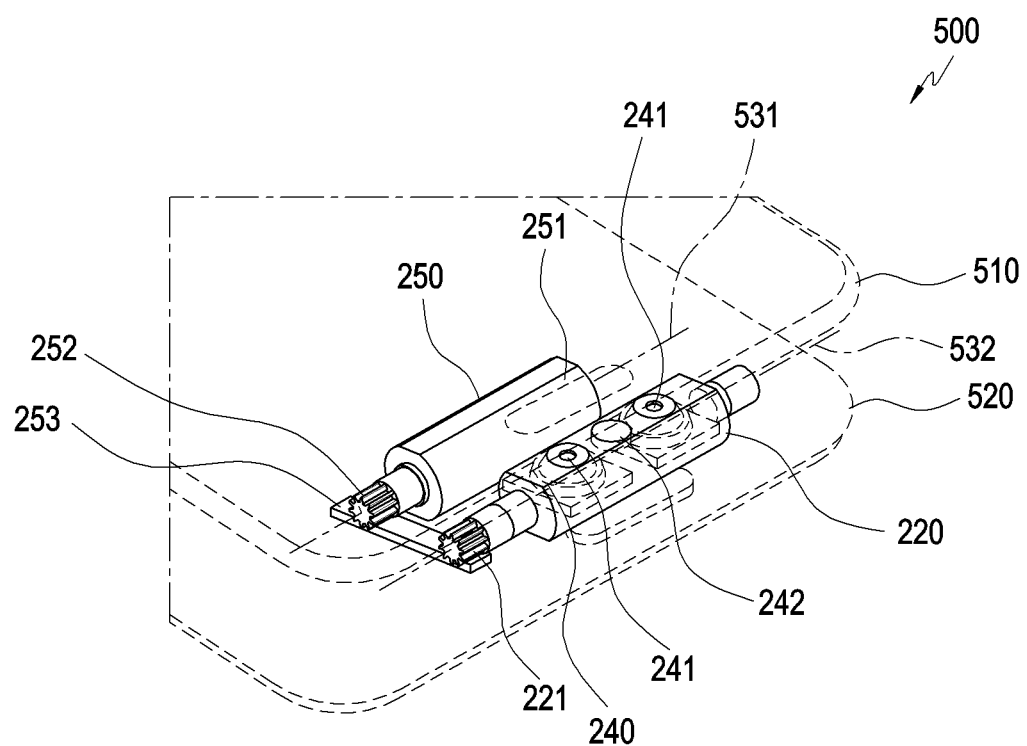
FIG. 5 is a diagram illustrating a rotation module and a driving module according to various example embodiments.

In an embodiment, the rotation module 220 may be rotated by a driving module (e.g., the driving module 250 in FIG. 5). For example, the rotation module 220 may rotate by a driving force of a driving motor (e.g., the driving motor 251 in FIG. 5) included in the driving module such that the second display 230 faces in the same direction as the direction in which the first display 210 faces or such that the second display 230 faces in a direction opposite the direction in which the first display 210 faces. An operation in which the rotation module 220 is rotated by the driving module will be described later in detail with reference to FIGS. 5 to 8.

In an embodiment, the audio module 205 may include at least one microphone hole and at least one speaker hole. A microphone for acquiring external sounds may be disposed in the microphone hole, and a plurality of microphones may be disposed to detect the direction of a sound. In an embodiment, the speaker hole and the microphone hole may be implemented as one hole, or a speaker (e.g., a piezo speaker) may be included without a speaker hole.

Although not shown in FIGS. 2 and 3, in an embodiment, the electronic device 101 may include a sensor module for detecting a variety of information. For example, the sensor module may include a sensor (e.g., an acceleration sensor, a gyro sensor, an illuminance sensor, and/or a proximity sensor) for detecting the state in which the electronic device 101 is placed on an object (e.g., a desk) and/or a posture of the electronic device 101 (e.g., a direction and/or a position of the electronic device 101). As another example, the sensor module may include a sensor (e.g., a Hall sensor) for detecting a rotation state of the rotation module 220. However, the sensors included in the sensor module are not limited to the above-described sensors.

In an embodiment, the key input device 207 may be disposed on the side surface 201C of the housing. In an embodiment, the electronic device 101 may exclude some or all of the above-mentioned key input devices, and the excluded key input devices may be implemented in other forms such as soft keys on the first display 210. In an embodiment, the key input device may include at least a portion of a fingerprint sensor disposed on the second surface 201B of the housing.

In an embodiment, the connector hole 206 may accommodate a connector for transmitting/receiving power and/or data to/from an external electronic device, and/or a connector for transmitting/receiving audio signals to/from an external electronic device. For example, the connector hole 206 may include a USB connector or an earphone jack.

Figure 4:
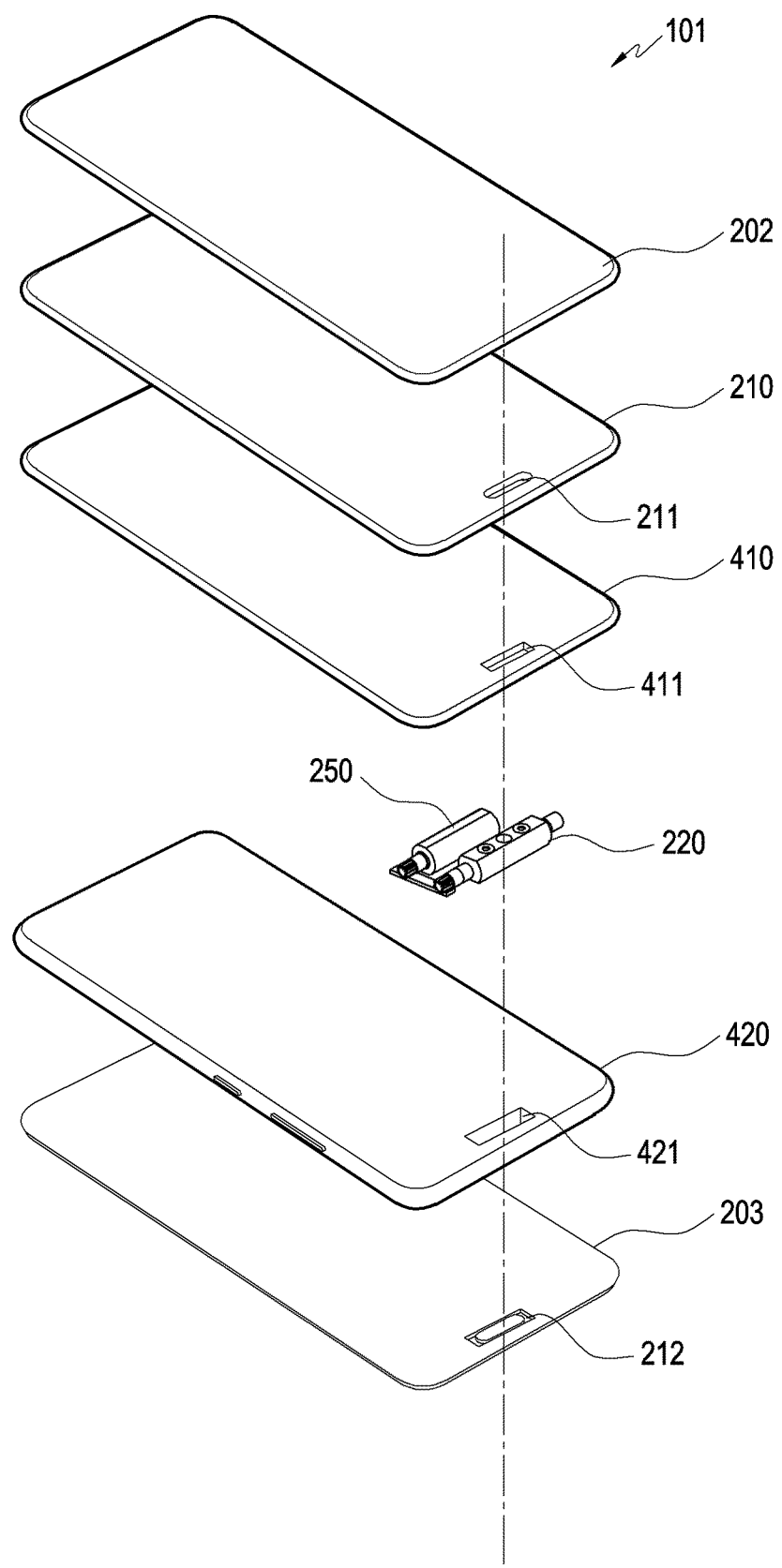
FIG. 4 is an exploded perspective view of an electronic device according to various example embodiments.

FIG. 4 is an exploded perspective view of an electronic device 101 according to various embodiments.

Referring to FIG. 4, in an embodiment, an electronic device 101 may include a front plate 202, a first display 210, and a first support member 410 (e.g., a bracket or a front case), a rotation module 220, and a driving module 250, a second support member 420, and/or a rear plate 203.

In an embodiment, the electronic device 101 may exclude at least one (e.g., the first support member 410 or the second support member 420) of the elements or further include other elements. At least one of the elements of the electronic device 101 may be the same as or similar to at least one of the elements of the electronic device 101 in FIGS. 2 and 3, and the redundant description thereof will be omitted below.

In an embodiment, the first support member 410 may be disposed inside the electronic device 101 and may be connected to the side structure 204 or integrally formed with the side structure 204. The first support member 410 may be formed of, for example, a metal material, and/or a non-metal (e.g., polymer) material. The first support member 410 may be coupled to a first display 210 on one side thereof and a printed circuit board (not shown) on the opposite side thereof. The printed circuit board may be equipped with a processor, a memory, and/or an interface, which are mounted thereon. The processor may include, for example, one or more of a central processing unit, an application processor, a graphic processing unit, an image signal processor, a sensor hub processor, and a communication processor.

In an embodiment, the driving module 250 and the rotation module 220 may be disposed between the first support member 410 and the second support member 420. In an embodiment, in the state in which the second display 230 included in the rotation module 220 faces in the same direction as the direction in which the first display 210 faces, the second display 230 may display a screen through an opening 211 formed in the first display 210 and an opening 411 formed in the first support member. In an embodiment, in the state in which the second display 230 included in the rotation module 220 faces in a direction opposite the direction in which the first display 210 faces, the second display 230 may display a screen through an opening 421 formed in the second support member 420 and an opening 212 formed in the rear plate 203. In an embodiment, in the state in which the camera module 240 included in the rotation module 220 faces in the same direction as the direction in which the first display 210 faces, the camera module 240 may photograph a subject located in a direction in which the first display 210 faces through the opening 211 formed in the first display 210 and the opening 411 formed in the first support member 410. In an embodiment, in the state in which the camera module 240 included in the rotation module 220 faces in a direction opposite the direction in which the first display 210 faces, the camera module 240 may photograph a subject located in a direction opposite the direction in which the first display 210 faces through the opening 421 formed in the second support member 420 and the opening 212 formed in the rear plate 203.

Figure 8:
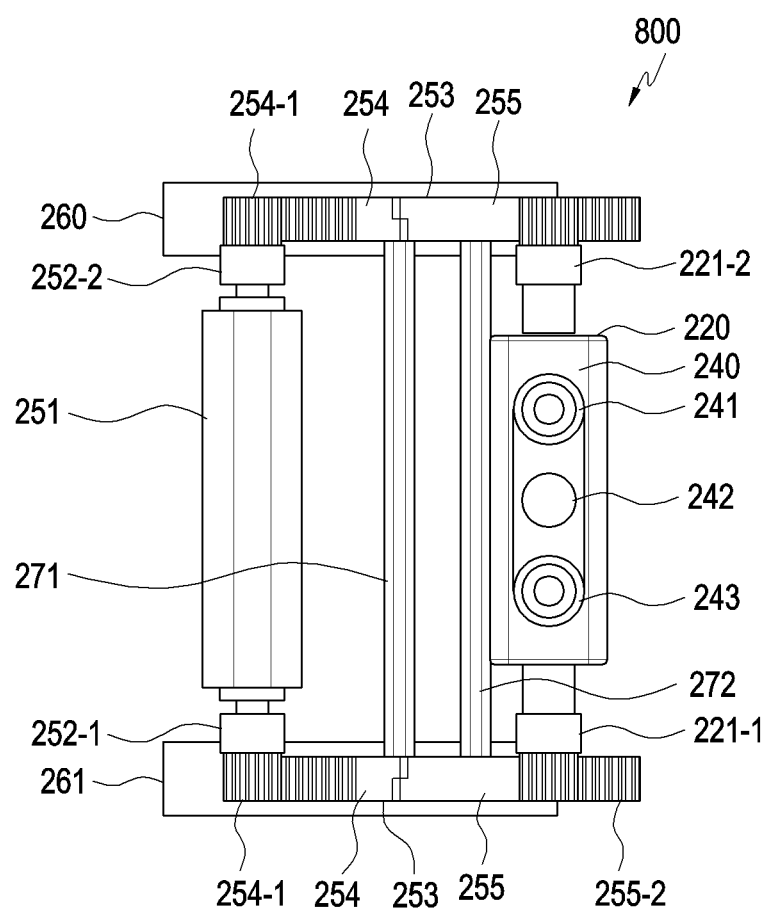
Figure 9:
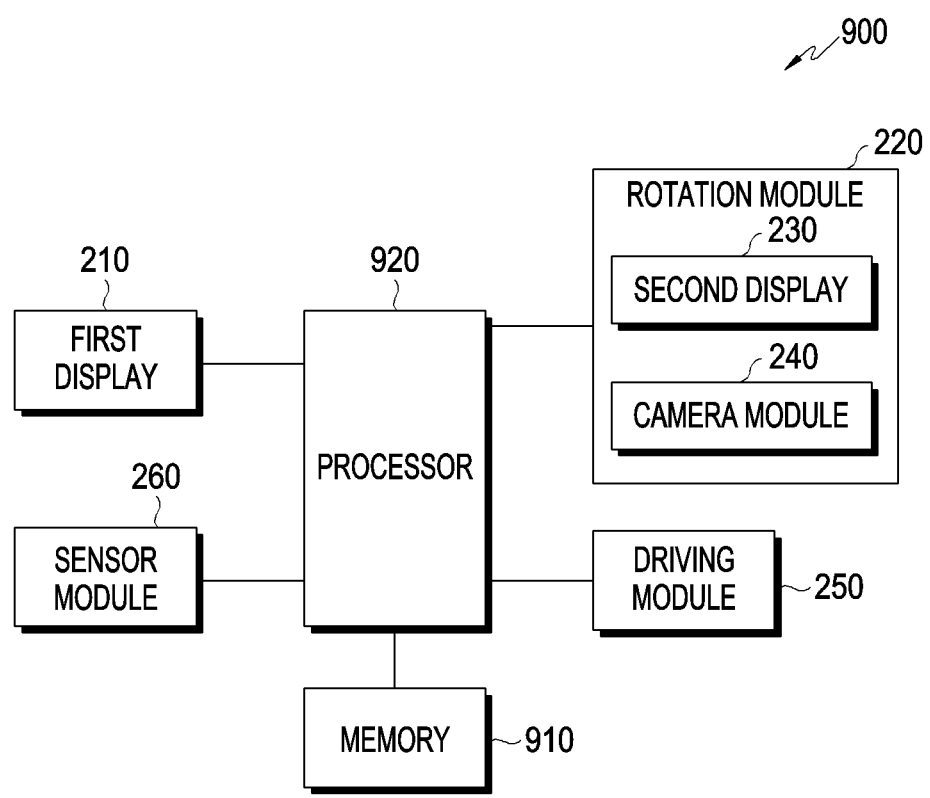
FIG. 9 is a block diagram of an electronic device according to various example embodiments.

In an embodiment, the driving module 250 (referred as "driver") may rotate the rotation module 220 under the control of a processor (e.g., the processor 120 in FIG. 1 or the processor 920 in FIG. 9). The configuration of the driving module 250 and the operation of the driving module 250 rotating the rotation module 220 will be described below with reference to FIGS. 5 to 8.

FIG. 5 is a diagram 500 illustrating a rotation module 220 and a driving module 250 according to various embodiments.

Referring to FIG. 5, in an embodiment, FIG. 5 may indicate the state in which the camera module 240 included in the rotation module 220 faces in the same direction as the direction in which the first display 210 faces. In an embodiment, in the state in which the camera module 240 faces in the same direction as the direction in which the first display 210 faces, at least one camera 241 or 243 and a flash 242 may be exposed to the outside through an opening formed in the first display 210.

In an embodiment, the rotation module 220 and the driving module 250 may be disposed between a configuration 510 in which the front plate 202, the first display 210, and the first support member 410 are coupled and a configuration 520 in which the second support member 420 and the rear plate 203 are coupled.

In an embodiment, the driving module 250 may include a driving motor 251 including a pinion gear 252, and a driving gear member 253. In an embodiment, as the driving motor 251 rotates, the driving gear member 253 may reciprocate in a straight line by a rack gear engaging with the pinion gear 252 of the driving motor 251. As the driving gear member 253 linearly reciprocates, a pinion gear 221 of the rotation module 220 engaging with the rack gear of the driving gear member 253 may rotate, and as the pinion gear 221 of the rotation module 220 rotates, the driving module 250 may rotate. In an embodiment, a rotation axis 531 of the driving motor 251 and a rotation axis 532 of the rotation module 220 may be parallel to each other. In an embodiment, the rotation module 220 may rotate by a specified angle (e.g., about 180 degrees) in a clockwise or counterclockwise direction about a rotation axis of the rotation module 220.

In an embodiment, although it is illustrated in FIG. 5 that the driving motor 251 transmits the rotational force to the rotation module 220 through the driving gear member 253, the disclosure is not limited thereto. For example, the electronic device 101 may be configured such that the pinion gear 252 of the driving motor 251 directly meshes with the pinion gear 221 of the rotation module 220 (e.g., the driving gear member 253 is omitted), thereby transmitting the rotational force of the driving motor 251 to the rotation module 220.

In an embodiment, although the pinion gear 252 coupled to one end of the driving motor 251, one driving gear member 253, and the pinion gear 221 coupled to one end of the rotation module 220 are illustrated in FIG. 5, the disclosure is not limited thereto. For example, the electronic device 101 may be configured such that the rotational force of the driving motor 251 is transmitted to the rotation module 220 through two pinion gears coupled to both ends of the driving motor 251, two pinion gears coupled to both ends of the rotation module 220, and two driving gear members (e.g., a first driving gear member of the two driving gear members, which engages with a first pinion gear of the two pinion gears coupled to both ends of the driving motor 251 and a first pinion gear of the two pinion gears coupled to both ends of the rotation module 220, and a second driving gear member of the two driving gear members, which engages with a second pinion gear of the two pinion gears coupled to both ends of the driving motor 251 and a second pinion gear of the two pinion gears coupled to both ends of the rotation module 220).

Figure 6:
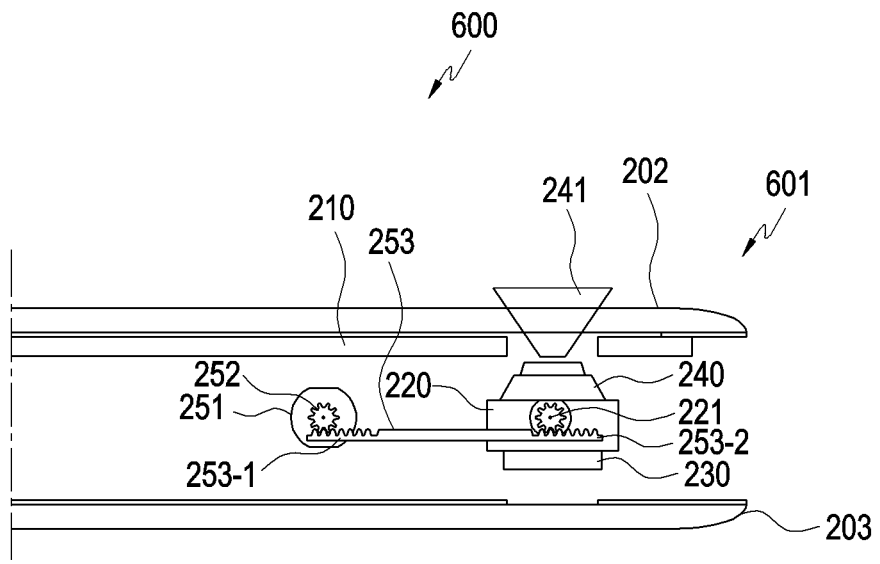
FIG. 6 is a diagram illustrating an operation in which a rotation module is rotated by a driving module according to various example embodiments.
Figure 6:
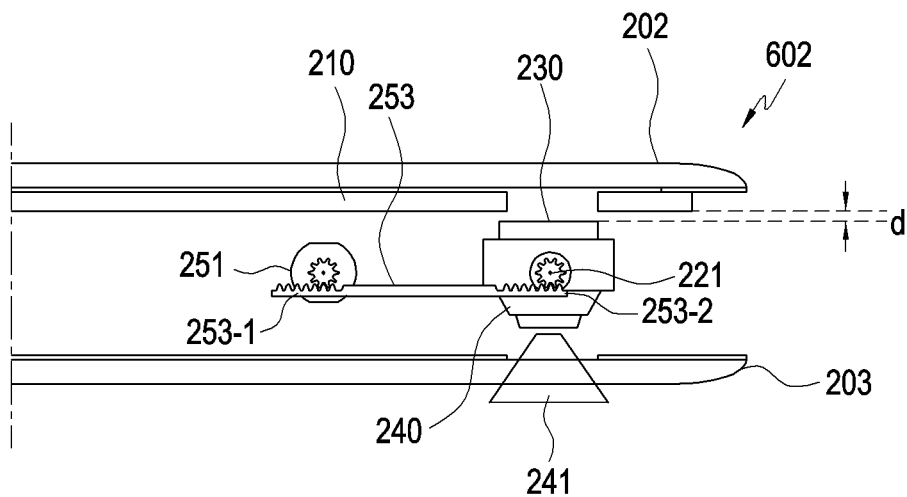

FIG. 6 is a diagram 600 illustrating an operation in which a rotation module 220 is rotated by a driving module 250 according to various embodiments.

Referring to FIG. 6, in an embodiment, reference numeral 601 may denote a state of the electronic device 101 in which the camera module 240 faces in the same direction as the direction in which the first display 210 faces (hereinafter, will be interchangeably used with a "first state of the electronic device 101" or a "first state"). In an embodiment, in the first state of the electronic device 101, the second display 230 may face in a direction opposite the direction in which the first display 210 faces. In an embodiment, a state of the electronic device 101 in which the second display 230 faces in the same direction as the direction in which the first display 210 faces (hereinafter, will be interchangeably used with a "second state of the electronic device 101" or a "second state") may be shown. In an embodiment, in the second state of the electronic device 101, the second display 230 may face in the same direction as the direction in which the first display 210 faces.

In an embodiment, if the pinion gear 252 of the driving motor 251 rotates clockwise about a rotation axis (e.g., the X-axis) of the driving motor 251 in the first state of the electronic device 101, the driving gear member 253 may be linearly moved in the −Y-axis direction by a rack gear 253-1 of the driving gear member 253 engaging with the pinion gear 252 of the driving motor 251. As the driving gear member 253 linearly moves in the −Y-axis direction, the pinion gear 221 of the rotation module 220 engaging with a rack gear 253-2 of the driving gear member 253 may rotate clockwise around the rotation axis (e.g., the X-axis) of the rotation module 220. As the pinion gear 221 of the rotation module 220 rotates clockwise, the electronic device 101 may switch to the second state.

In an embodiment, if the pinion gear 252 of the driving motor 251 rotates counterclockwise about the rotation axis (e.g., the X-axis) of the driving motor 251 in the second state of the electronic device 101, the driving gear member 253 may be linearly moved in the +Y-axis direction by a rack gear 253-1 of the driving gear member 253 engaging with the pinion gear 252 of the driving motor 251. As the driving gear member 253 linearly moves in the +Y-axis direction, the pinion gear 221 of the rotation module 220 engaging with the rack gear 253-2 of the driving gear member 253 may rotate counterclockwise around the rotation axis (e.g., the X-axis) of the rotation module 220. As the pinion gear 221 of the rotation module 220 rotates counterclockwise, the electronic device 101 may switch to the first state.

In an embodiment, the camera module 240 may photograph a subject within the angle of view 241 of the camera module 240 through the opening formed in the first display 210 or through the rear plate 203.

In an embodiment, the second display 230 may display a screen through the rear surface of the electronic device 101 in the first state of the electronic device 101. In an embodiment, in the second state of the electronic device 101, the second display 230 may display a screen together with the first display 210 or display a screen independently of the first display 210 (e.g., in the state in which the first display 210 is turned off) through the front surface of the electronic device 101.

In an embodiment, the size (e.g., area) of the second display 230 may be greater than the size (e.g., area) of the opening formed in the first display 210 or may be the same as the size of the opening formed in the first display 210.

Figure 7:
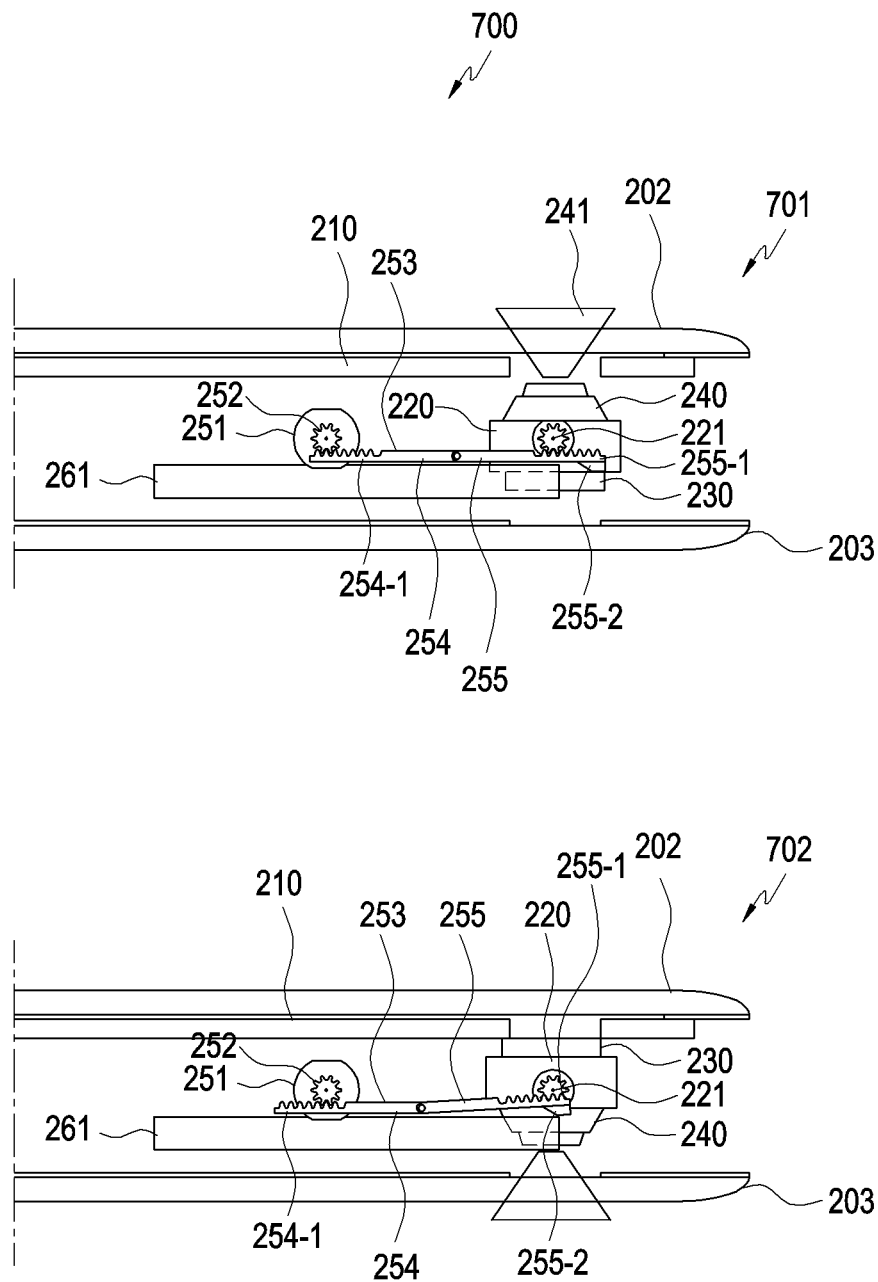
FIGS. 7 and 8 are diagrams illustrating an operation in which a rotation module is rotated by a driving module according to various example embodiments.

FIGS. 7 and 8 are diagrams 700 and 800 illustrating an operation in which a rotation module 220 is rotated by a driving module 250 according to various embodiments.

Referring to FIGS. 7 and 8, in an embodiment, as shown by reference numeral 602 in FIG. 6, there may be a difference (d) (also referred to as a "gap") between the first display 210 and the second display 230 (e.g., a height difference between the first display 210 and the second display 230) in the second state of the electronic device 101 (e.g., in the state in which the first display 210 and the second display 230 face in the same direction). In an embodiment, the electronic device 101 may be implemented to minimize or reduce the difference (d) between the first display 210 and the second display 230 in the second state of the electronic device 101.

In an embodiment, as shown by reference numerals 701 and 702, the driving gear member 253 may include a first driving gear member 254-1 and a second driving gear member 255-1.

In an embodiment, the first driving gear member 254 may linearly reciprocate by the driving force of the driving motor 251. For example, the first driving gear member 254 may linearly reciprocate on the guide member 261 by the rack gear 254-1 of the first driving gear member 254 engaging with the pinion gear 252 of the driving motor 251.

In an embodiment, the second driving gear member 255 may linearly reciprocate and rotate by the driving force of the driving motor 251. In an embodiment, the second driving gear member 255 may rotate between the position at which the second driving gear member is in a straight line with the first driving gear member 254 and the position at which the second driving gear member inclines at a specified angle with the first driving gear member 254 while an interference protrusion 255-2 formed on the surface opposite the surface on which the rack gear 255-1 is formed comes into contact with the guide member 261. For example, the second driving gear member 255 coupled with the first driving gear member 254 may linearly reciprocate so as to be rotatable (or pivotable) with respect to the first driving gear member 254 while the first driving gear member 254 linearly reciprocates. When the second driving gear member 255 linearly reciprocates, the interference protrusion 255-2 of the second driving gear member 255 may come into contact with the guide member 261 so that the second driving gear member 255 may rotate between the position at which the second driving gear member is in a straight line with the first driving gear member 254 and the position at which the second driving gear member inclines at a specified angle with the first driving gear member 254.

In an embodiment, the rotation module 220 may linearly move in the +Z-axis direction or the −Z-axis direction while the second driving gear member 255 rotates. For example, comparing the reference numeral 602 in FIG. 6 with the reference numeral 702, since the interference protrusion 255-2 of the second driving gear member 255 is positioned on the guide member 261 in the second state of the electronic device 101 as shown by the reference numeral 702, the difference in height between the first display 210 and the second display 230 in the reference numeral 702 in FIG. 7 may be less than the difference in height between the first display 210 and the second display 230 in the reference numeral 602 in FIG. 6. Accordingly, it is possible to minimize or reduce the heterogeneity between the screen displayed on the first display 210 and the screen displayed on the second display 230 when the electronic device 101 displays screens through the first display 210 and the second display 230.

In an embodiment, FIG. 8 may show a plan view of the driving module 250, the rotation module 220, and the guide member 261 shown in FIG. 7. In an embodiment, as shown in FIG. 8, the electronic device 101 may include two pinion gears 252-1 and 252-2 coupled to both ends of the driving motor 251, two pinion gears 221-1 and 221-2 coupled to both ends of the rotation module 220, two driving gear members 253, and/or two guide members 260. In an embodiment, the electronic device 101 may include two connecting members 271 and 272 connecting the two driving gear members in order to enable the two driving gear members 253 to stably reciprocate in a straight line. For example, a first connecting member 271 may connect the two first driving gear members 254, and a second connecting member 272 may connect the two second driving gear members 255.

In an embodiment, as shown in FIG. 8, the electronic device 101 may include two pinion gears 252-1 and 252-2 coupled to both ends of the driving motor 251, two pinion gears 221-1 and 221-2 coupled to both ends of the rotation module 220, two driving gear members 253, and/or two guide members 260, enabling stable rotation of the rotation module 220.

FIG. 9 is a block diagram 900 of an electronic device 101 according to various embodiments.

Referring to FIG. 9, in an embodiment, an electronic device 101 may include a first display 210, a rotation module 220 including a second display 230 and a camera module 240, a driving module 250, a sensor module 260, a memory 910, and/or a processor 920. In an embodiment, although not shown in FIG. 9, the electronic device 101 may further include configurations related to the housing shown in FIGS. 2 to 4.

In an embodiment, the first display 210 may be included in the display module 160 in FIG. 1. In an embodiment, an opening may be formed in a portion of the screen display area of the first display 210, and the rotation module 220 may be exposed through the opening. For example, the second display 230 or the camera module 240 included in the rotation module 220 may be exposed through the opening.

In an embodiment, the sensor module 260 may be included in the sensor module 176 in FIG. 1.

In an embodiment, the sensor module 260 may include a sensor (e.g., an acceleration sensor, a gyro sensor, an illuminance sensor, and/or a proximity sensor) for detecting the state in which the electronic device 101 is placed on an object (e.g., a desk) and/or a posture of the electronic device 101 (e.g., a direction and/or a position of the electronic device 101).

In an embodiment, the sensor module 260 may include a sensor (e.g., a Hall sensor) for detecting a rotation state of the rotation module 220. For example, a Hall sensor may be disposed in a position adjacent to the rotation module 220, and at least one magnet may be disposed in the rotation module 220. The Hall sensor may detect a magnetic field generated by at least one magnet disposed in the rotation module 220 according to the rotation of the rotation module 220, thereby detecting the rotation state of the rotation module 220 (e.g., the first state in which the second display 230 faces in the same direction as the direction in which the first display 210 faces or the second state in which the second display 230 faces in a direction opposite the direction in which the first display 210 faces). However, the sensor for detecting the state of the rotation module 220 is not limited to the Hall sensor.

In an embodiment, the rotation module 220 may include a second display 230 and a camera module 240 that faces in a direction opposite the direction in which the second display 230 faces. For example, the second display 230 may be disposed on a first surface of the rotation module 220, and the camera module 240 may be disposed on a second surface of the rotation module 220, which is opposite the first surface. In an embodiment, the second display 230 may be included in the display module 160 in FIG. 1, and the camera module 240 may be included in the camera module 180 in FIG. 1. Since the second display 230 and the camera module 240 included in the rotation module 220 have been described above, a detailed description thereof will be omitted.

In an embodiment, the rotation module 220 may further include a display driver IC for driving the second display 230. The display driver IC may communicate with a processor 920 (e.g., the processor 120 in FIG. 1) through an interface (e.g., a display serial interface). When a control signal and/or data is received from the processor 920, the display driver IC may control the second display 230 to display the received data thereon.

In an embodiment, the driving module 250 may rotate the rotation module 220 by the driving force of the driving motor 251. Since the driving module 250 has been described with reference to FIGS. 5 to 8, a detailed description thereof will be omitted.

In an embodiment, the memory 910 may be included in the memory 130 in FIG. 1.

In an embodiment, the memory 910 may store a variety of information for the electronic device 101 to perform an operation.

In an embodiment, the processor 920 may be included in the processor 120 in FIG. 1.

In an embodiment, the processor 920 may control overall operation of the electronic device 101. In an embodiment, the processor 920 may include one or more processors for controlling the operation of the electronic device 101.

In an embodiment, although it has been described in FIG. 9 that the first display 210, the rotation module 220 including the second display 230 and the camera module 240, the driving module 250, the sensor module 260, and the memory 910, and/or the processor 920 are included, the disclosure is not limited thereto. For example, the electronic device 101 may further include at least one element (e.g., the communication module 190) among the elements of the electronic device 101 illustrated in FIG. 1.

An electronic device 101 according to various embodiments of the disclosure may include a first display 210, a rotation module 220 including a second display 230 and a camera module 240 which faces in a direction opposite to a direction in which the second display 230 faces, a driving module 250 configured to rotate the rotation module 220 such that the second display 230 faces in a first direction in which the first display 210 faces or in a second direction opposite to the first direction, and at least one processor (e.g., the processor 920), wherein the at least one processor (e.g., the processor 920) may be configured to display an execution screen of an application on the first display 210 and the second display 230 in a state in which the first display 210 and the second display 230 face in the first direction, based on a specified input, control the driving module 250 such that the camera module 240 faces in the first direction, and display, on the first display 210, an image obtained through the camera module 240 in the state in which the camera module 240 faces in the first direction.

In various embodiments, the at least one processor (e.g., the processor 920) may be configured to display a first part of the execution screen on the first display 210 and display a second part of the execution screen on the second display 230 in the state in which the first display 210 and the second display 230 face in the first direction.

In various embodiments, the specified input may be an input for obtaining an image of a subject located in the first direction through the camera module 240.

In various embodiments, the at least one processor (e.g., the processor 920) may be configured to display content related to the application on the second display 230 facing in the second direction in the state in which the camera module 240 faces in the first direction.

In various embodiments, the content related to the application may include an icon indicating the application and/or information indicating a function being executed through the application.

In various embodiments, the electronic device 101 may further include a sensor module 260, and the at least one processor (e.g., the processor 920) may be configured to detect a state of the electronic device 101 through the sensor module 260, control the driving module 250 such that the second display 230 faces in the second direction, in a state in which the electronic device 101 is placed so that the front surface of the electronic device 101 faces an object and in which the second display 230 faces in the first direction, and display information including a current time and/or a notification on the second display 230.

In various embodiments, the electronic device 101 may further include a sensor module 260, and the at least one processor may be configured to identify whether or not the second display 230 faces in the first direction through the sensor module 260, based on an always-on display (AOD) function being executed, display information corresponding to the AOD function on the second display 230 based on the second display 230 facing in the first direction, and, based on an input touching the first display 210, deactivate the second display 230 and display information corresponding to the AOD function on the first display 210.

In various embodiments, the at least one processor (e.g., the processor 920) may be configured to display information corresponding to the AOD function on the second display 230 based on the second display 230 facing in the second direction, and, based on an input for turning the electronic device 101 over, deactivate the second display 230 and display information corresponding to the AOD function on the first display 210.

In various embodiments, the driving module 250 may include a driving motor 251 and a driving gear member 253, and the at least one processor (e.g., the processor 920) may be configured to control the driving motor 251 such that the driving gear member 253 linearly reciprocates by the rotational force of the driving motor 251 so that the camera module 240 faces in the first direction, based on the specified input, and the rotation module 220 may be rotated as the driving gear member 253 linearly reciprocates.

In various embodiments, the electronic device 101 may further include a guide member 261, wherein the driving gear member 253 may include a first driving gear member 254 configured to linearly reciprocate by the driving motor 251 and a second driving gear member 255 configured to move together with the first driving gear member 254 while the first driving gear member 254 is linearly reciprocating and coupled to the first driving gear member 254 so as to rotate, and wherein the rotation module 220 connected to the second driving gear member 255 may rotate and move to linearly reciprocate in the first direction or in the second direction as an interference protrusion of the second driving gear member 255 moves while being in contact with the guide member 261.

Figure 10:
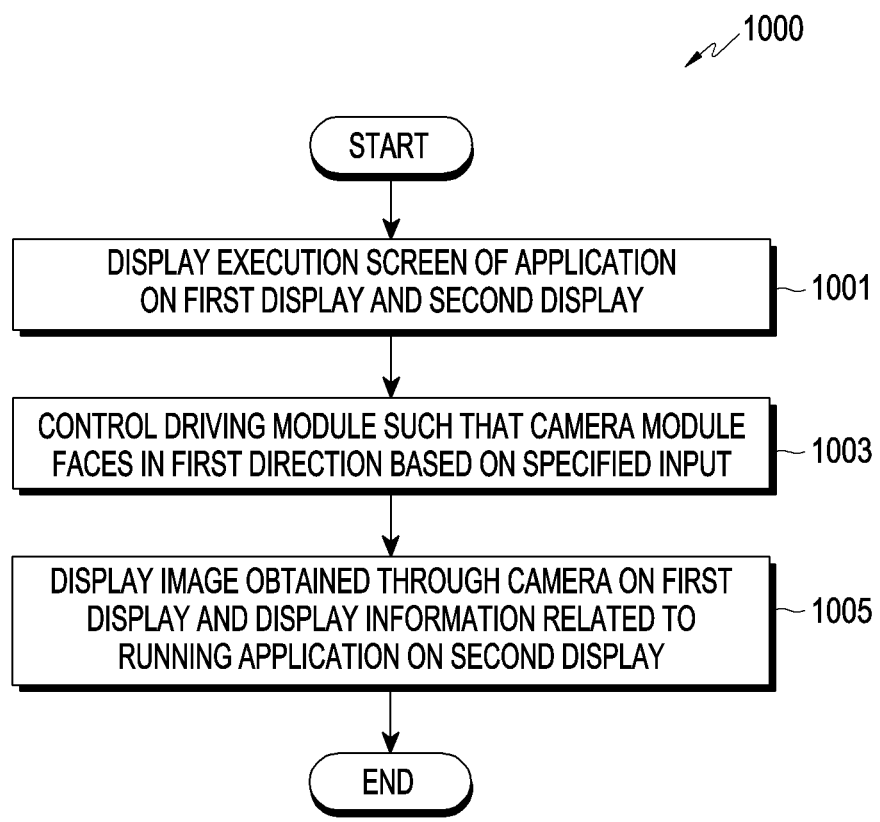
FIG. 10 is a flowchart illustrating a method of operating an electronic device according to various example embodiments.

FIG. 10 is a flowchart 1000 illustrating a method of operating an electronic device 101 according to various embodiments.

Figure 11:
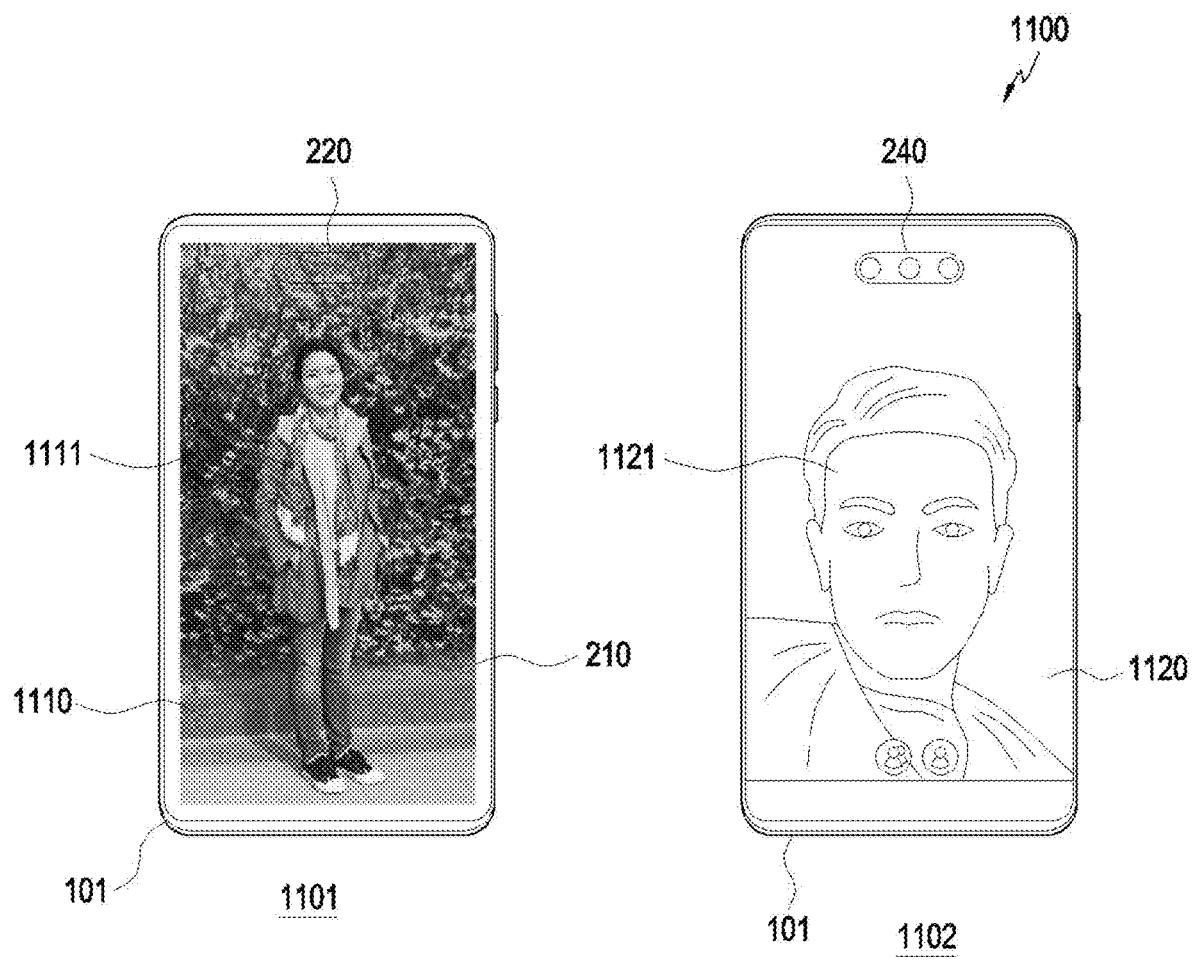
FIGS. 11 and 12 are exemplary diagrams illustrating a method of operating an electronic device according to various example embodiments.
Figure 12:
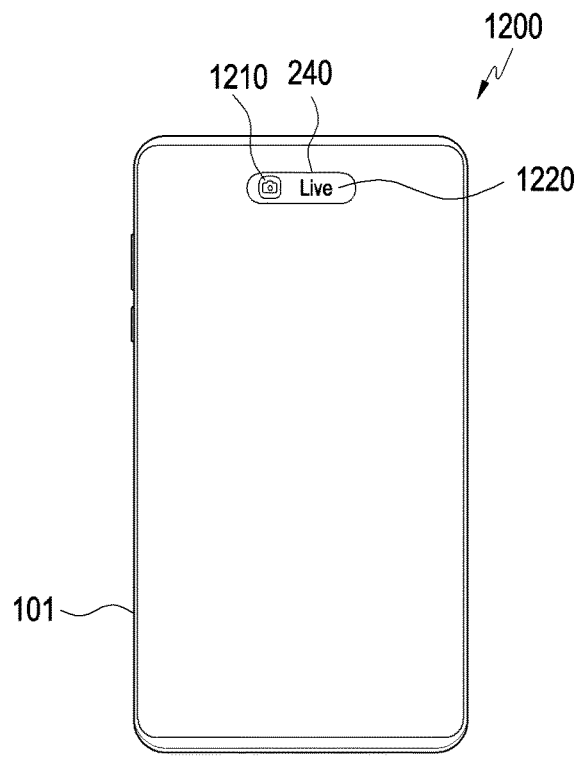

FIGS. 11 and 12 are exemplary diagrams 1100 and 1200 illustrating a method of operating an electronic device 101 according to various embodiments Referring to FIGS. 10 to 12, in operation 1001, in an embodiment, the processor 920 may display an execution screen of an application on the first display 210 and the second display 230 in the state in which the first display 210 and the second display 230 face in the same first direction.

In an embodiment, the processor 920 may execute an application, based on an input for executing the application. The processor 920 may display an execution screen of the executed application on the first display 210 and the second display 230 in the state (the first state of the electronic device 101) in which the first display 210 and the second display 230 face in the same first direction (hereinafter referred to as a "first direction").

In an embodiment, in order to display one piece of content (e.g., one web page, one image, or one document) as the execution screen of an application on the first display 210 and the second display 230 in the state in which the second display 230 faces in the first direction, the processor 920 may control a first display driver IC electrically connected to the first display 210 and a second display driver IC electrically connected to the second display 230. For example, with regard to content including a first part and a second part, the processor 920 may control the first display driver IC and the second display driver IC such that the first part is displayed on the first display 210 and such that the second part is displayed on the second display 230. In an embodiment, the second display driver IC electrically connected to the second display 230 may be included in the rotation module 220.

In an embodiment, in the case where a camera application is executed, the processor 920 may obtain an image through the camera module 240 facing in a direction (hereinafter referred to as a "second direction") opposite the first direction in which the first display 210 faces. The processor 920 may display the image (e.g., a preview image) obtained by the camera module 240 on the first display 210 and the second display 230 facing in the same first direction. For example, as shown by reference numeral 1101 in FIG. 11, if a camera application is executed, the processor 920 may obtain an image 1110 including an image part 1111 of a subject located in the second direction by the camera module 240 facing in the second direction. The processor 920 may display the obtained image 1110 on the first display 210 and the second display 230. However, the screen displayed on the first display 210 and the second display 230 in the state in which the first display 210 and the second display 230 face in the same first direction is not limited to the screen including the above-described image. For example, the processor 920 may display a home screen, a standby screen, a menu screen, or a lock screen on the first display 210 and the second display 230 in the state in which the first display 210 and the second display 230 face in the same first direction. For another example, the processor 920 may display execution screens of various applications such as a webpage screen or a social networking service (SNS) screen on the first display 210 and the second display 230 in the state in which the first display 210 and the second display 230 face in the same first direction.

In operation 1003, in an embodiment, the processor 920, based on a specified input, may control the driving module 250 such that the camera module 240 included in the rotation module 220 faces in the first direction in which the first display 210 faces. For example, based on a specified input in the state in which the first display 210 and the second display 230 face in the first direction, the processor 920 may control the driving module 250 such that the camera module 240 included in the rotation module 220 is directed from the second direction to the first direction.

In an embodiment, the specified input may be an input for photographing a subject located in the first direction (the direction in which the front surface of the electronic device 101 faces). For example, the specified input may be a user input for obtaining an image of a user (e.g., a selfie image) located in the first direction while the camera application is running. As another example, the specified input may be a user input for obtaining an image of a subject located in the first direction while a video call application is running. As another example, the specified input may be a user input for obtaining an image of a subject located in the first direction while an SNS application is running. However, the input for photographing a subject located in the first direction, as a specified input, is not limited to the above-described examples.

In an embodiment, the specified input may be an input for rotating the rotation module 220 such that the camera module 240 included in the rotation module 220 faces in the first direction. For example, the specified input may be an input to a physical key or a soft key displayed on the first display 210 for rotating the rotation module 220 such that the camera module 240 included in the rotation module 220 faces in the first direction (or the camera module 240 included in the rotation module 220 faces in the second direction).

In an embodiment, based on the specified input, the processor 920 may control the driving module 250 to rotate the rotation module 220 such that the camera module 240 is directed from the second direction to the first direction in which the first display 210 faces. For example, referring to FIG. 6, in the first state of the electronic device 101 in which the camera module 240 faces in the second direction, the processor 920 may control the driving motor 251 such that the pinion gear 252 of the driving motor 251 rotates clockwise about the rotation axis (e.g., the X-axis) of the driving motor 251. When the pinion gear 252 of the driving motor 251 rotates clockwise about the rotation axis (e.g., the X-axis) of the driving motor 251, the driving gear member 253 may linearly move in the −Y-axis direction by the rack gear 253-1 of the driving gear member 253 engaging with the pinion gear 252 of the driving motor 251. As the driving gear member 253 linearly moves in the −Y-axis direction, the pinion gear 252 of the rotation module 220 engaging with the rack gear 253-2 of the driving gear member 253 may rotate clockwise around the rotation axis (e.g., the X-axis) of the rotation module 220. As the pinion gear 221 of the rotation module 220 rotates clockwise, the electronic device 101 may switch to the state in which the camera module 240 included in the rotation module 220 faces in the first direction. However, although the above example has been described based on the case in which the electronic device 101 is implemented as shown in FIG. 6, in the case where the electronic device 101 is implemented as shown in FIGS. 7 and 8, the electronic device 101 may switch to the state in which the camera module 240 included in the rotation module 220 faces in the first direction in the same or similar manner as the above-described method.

In operation 1005, in an embodiment, the processor 920 may display, on the first display 210, an image obtained through the camera module 240 in the state where the camera module 240 faces in the first direction and display information related to the running application on the second display 230.

In an embodiment, as shown by reference numeral 1102 in FIG. 11, the processor 920 may obtain an image 1120 including an image part 1121 of a subject located in the first direction by the camera module 240 facing the first direction while the camera application is running. The processor 920 may display the obtained image 1120 on the first display 210.

In an embodiment, the processor 920 may display information related to the running application on the second display 230 facing in the second direction while the image obtained through the camera module 240 facing in the first direction is being displayed on the first display 210. For example, the processor 920 may display an image obtained through the camera module 240 facing in the first direction on the first display 210 when an SNS application is executed (e.g., when a live broadcasting function of the SNS application is running) and, as shown in FIG. 12, display information related to the SNS application (e.g., an icon 1210 indicating the SNS application and/or text 1220 indicating the function being executed through the SNS application) on the second display 230 facing in the second direction. However, the disclosure is not limited thereto, and for example, the processor 920 may control the second display 230 (or the second display driver IC electrically connected to the second display 230) such that the second display 230 facing in the second direction enters an inactive state (e.g., a turn-off state) while the image obtained through the camera module 240 facing in the first direction is being displayed on the first display 210.

Although not shown in FIGS. 10 to 12, in an embodiment, the processor 920 may control the driving module 250 such that the camera module 240 faces in the second direction, based on a specified input while the camera module 240 faces in the first direction. For example, if an input for photographing a subject located in the second direction (the direction in which the rear surface of the electronic device 101 faces) is received, the processor 920 may control the driving module such that the camera module 240 faces in the second direction in order to photograph the subject located in the second direction. As another example, if an input for rotating the rotation module 220 is received such that the camera module 240 faces in the second direction, the processor 920 may control the driving module 250 such that the camera module 240 faces in the second direction. In an embodiment, if the rotation module 220 is rotated such that the camera module 240 faces in the second direction, the processor 920 may display the same content (e.g., one piece of content) on the first display 210 and the second display 230 facing in the same first direction (e.g., in the area of the first display 210 and the area of the second display 230).

Figure 13:
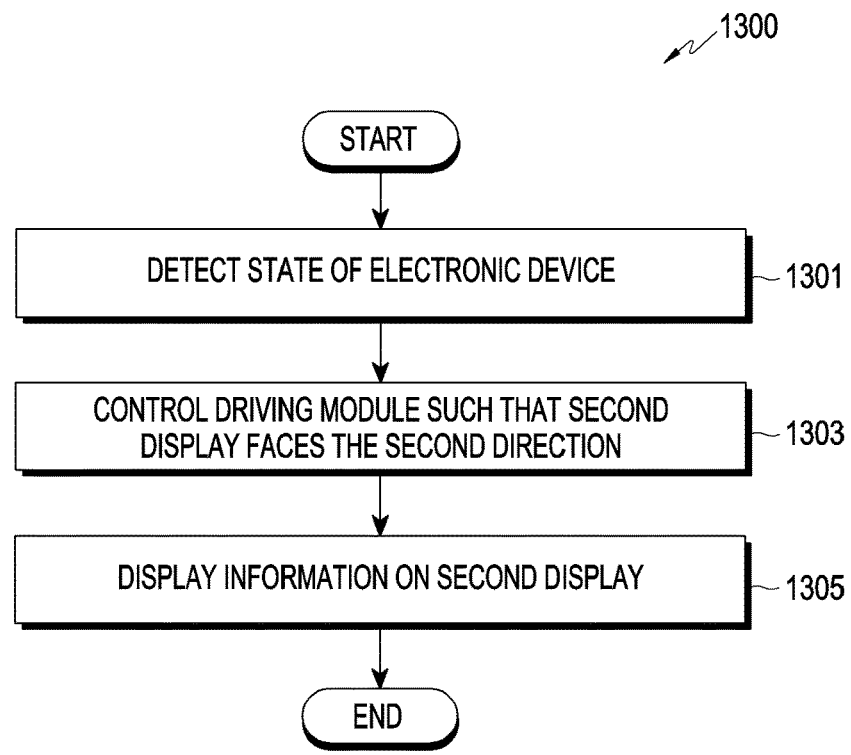
FIG. 13 is a flowchart illustrating a method of controlling a state of a rotation module, based on a state of an electronic device, according to various example embodiments.

FIG. 13 is a flowchart 1300 illustrating a method of controlling a state of a rotation module 220, based on a state of an electronic device 101, according to various embodiments.

Figure 14:
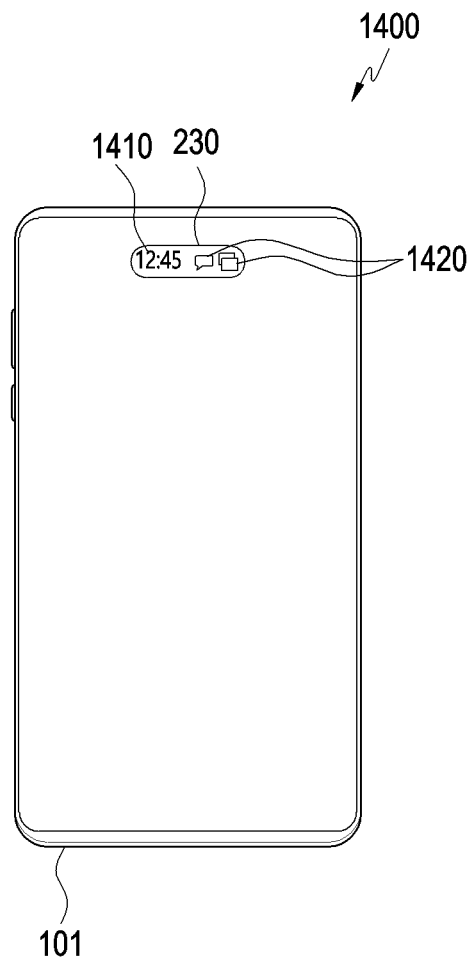
FIG. 14 is an exemplary diagram illustrating a method of controlling a state of a rotation module, based on a state of an electronic device, according to various example embodiments.

FIG. 14 is an exemplary diagram 1400 illustrating a method of controlling a state of a rotation module 220, based on a state of an electronic device 101, according to various embodiments.

Referring to FIGS. 13 and 14, in operation 1301, in an embodiment, the processor 920 may detect the state of an electronic device 101 by the sensor module 260. For example, the processor 920 may detect the state in which the electronic device 101 is placed on an object (e.g., a desk) and/or a posture of the electronic device 101 (e.g., a direction and/or a position of the electronic device 101) by the sensor module 260 (e.g., an acceleration sensor, a gyro sensor, an illuminance sensor, and/or a proximity sensor). As another example, the processor 920 may detect the rotation state of the rotation module 220 (e.g., whether the second display 230 of the rotation module 220 faces in the first direction or the second direction) by the sensor module 260 (e.g., a Hall sensor).

In an embodiment, the processor 920 may identify whether a notification is received from an external electronic device through a communication module (e.g., the communication module 190).

In operation 1303, in an embodiment, the processor 920 may control the driving module 250 such that the second display 230 faces in the second direction, based on the state of the electronic device 101. For example, in the state in which the front surface of the electronic device 101 is placed to face an object (e.g., a desk) and in which the second display 230 faces in the first direction, the processor 920 may driving module 250 such that the second display 230 faces in the second direction. For another example, if a notification is received from an external electronic device through a communication module in the state where the front surface of the electronic device 101 is placed to face an object and where the second display 230 faces in the first direction, the processor 920 may control the driving module 250 such that the second display 230 faces in the second direction. As another example, in the state in which the second display 230 faces in the first direction (or if a notification is received from an external electronic device through a communication module in the state where the second display 230 faces in the first direction), the processor 920 may control the driving module 250 such that the second display 230 faces in the second direction. As another example, in the state where the front surface of the electronic device 101 is placed to face an object and where the second display 230 faces in the second direction (and/or if a notification is received from an external electronic device through a communication module), the processor 920 may control the driving module 250 so as to maintain the state in which the first display 210 faces in the second direction. As another example, in the state in which the second display 230 faces in the second direction (and if a notification is received from an external electronic device through a communication module), the processor 920 may control the driving module 250 so as to maintain the state in which the first display 210 faces in the second direction.

In operation 1305, in an embodiment, the processor 920 may display information on the second display 230 facing in the second direction.

In an embodiment, the processor 920 may display information including the current time and/or a notification (e.g., the notification received through the communication module) on the second display 230 facing in the second direction. For example, as shown in FIG. 14, the processor 920 may display the current time 1410 and/or the notification 1420 received through the communication module on the second display 230 facing in the second direction. However, the information displayed on the second display 230 facing in the second direction is not limited to the above-described examples. For example, the processor 920 may display, on the second display 230 facing in the second direction, the current time, notifications received through the communication module, information on settings configured in the electronic device 101 (e.g., whether or not to set sound and/or vibration), information related to the communication state of the electronic device 101 (e.g., whether or not the electronic device 101 is able to communicate with an external electronic device, or an indication indicating a communication type and/or a signal strength for communication), and/or information related to a battery (e.g., an indication indicating a remaining battery level and/or whether or not charging is performed).

Figure 15:
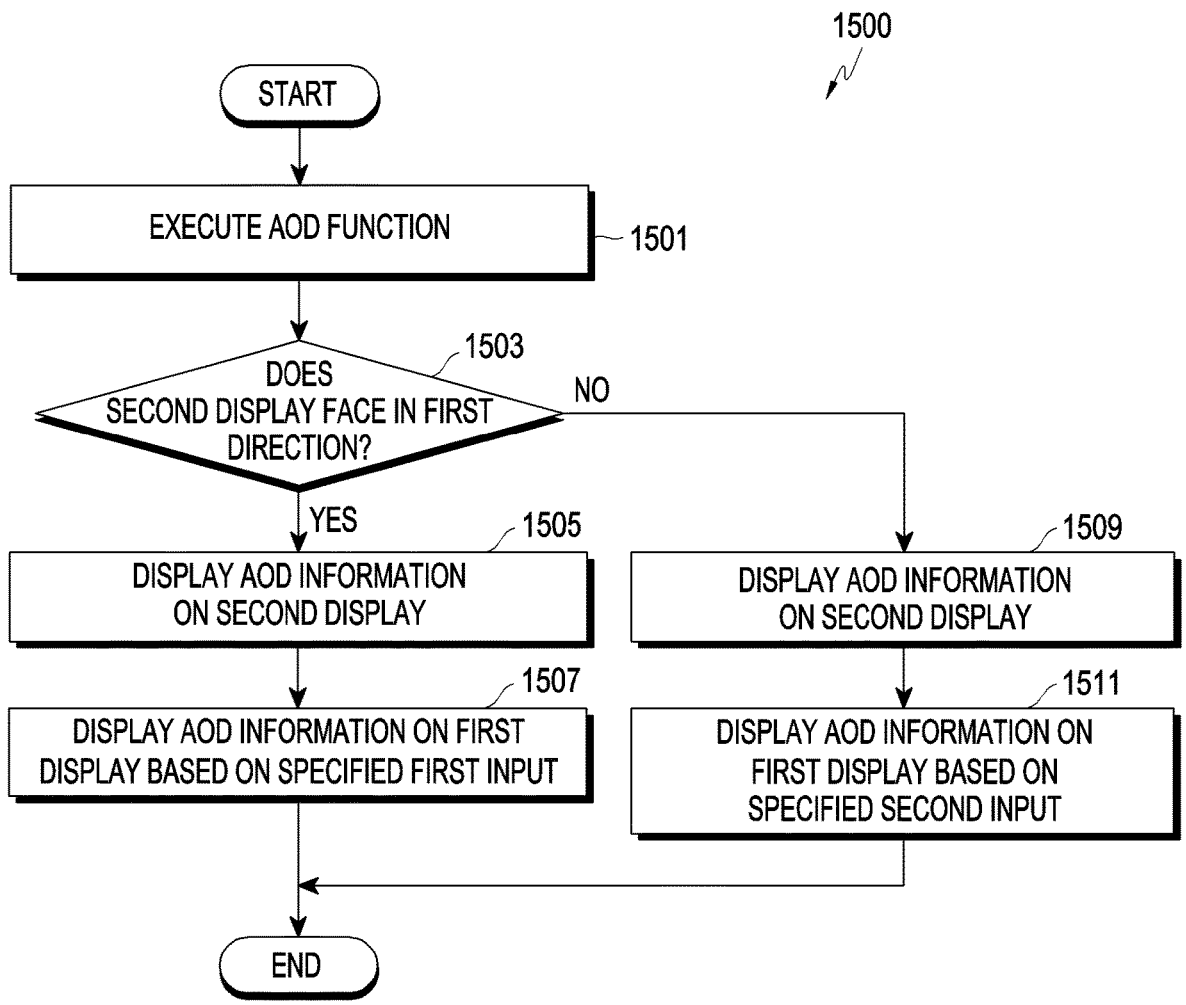
FIG. 15 is a flowchart illustrating a method of displaying AOD information according to various example embodiments.

FIG. 15 is a flowchart 1500 illustrating a method of displaying AOD information according to various embodiments.

Figure 16:
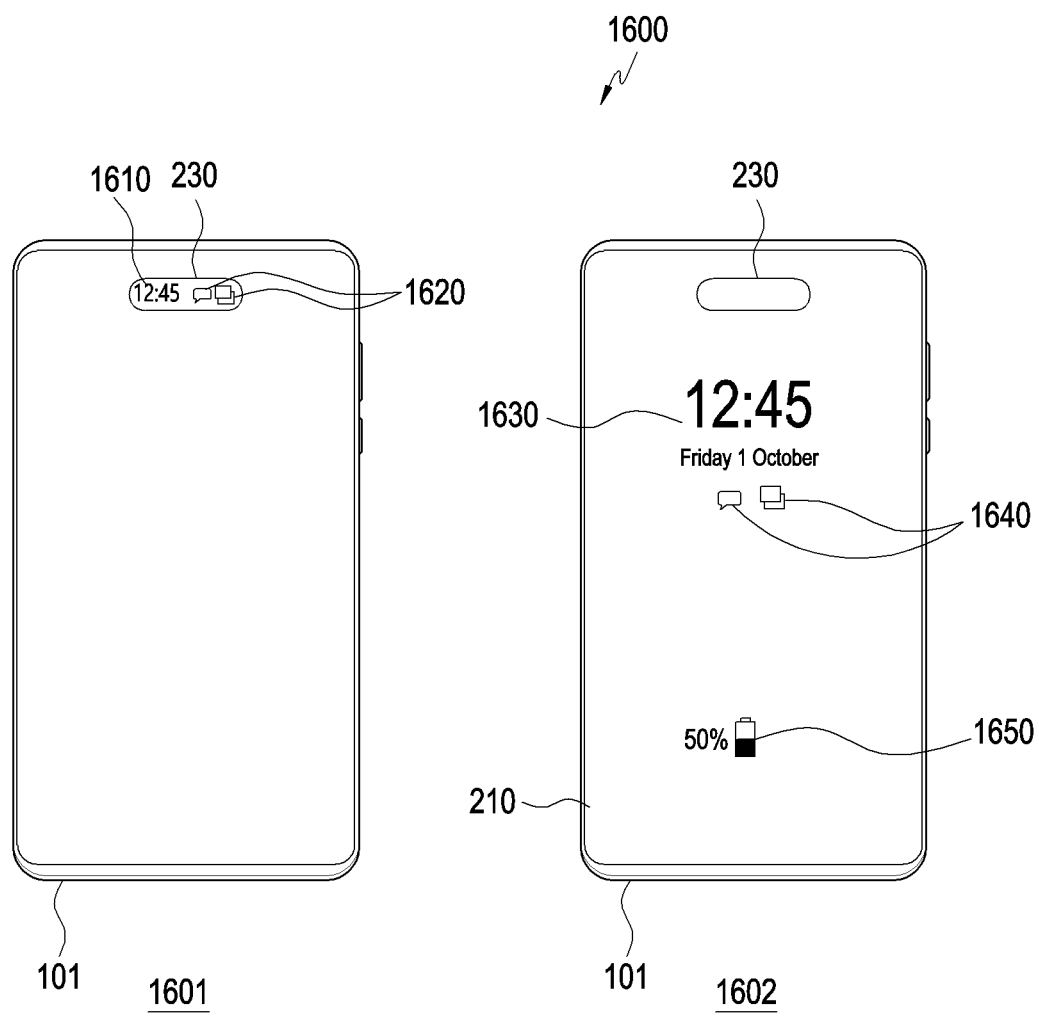
FIGS. 16 and 17 are exemplary diagrams illustrating a method of displaying AOD information according to various example embodiments.
Figure 17:
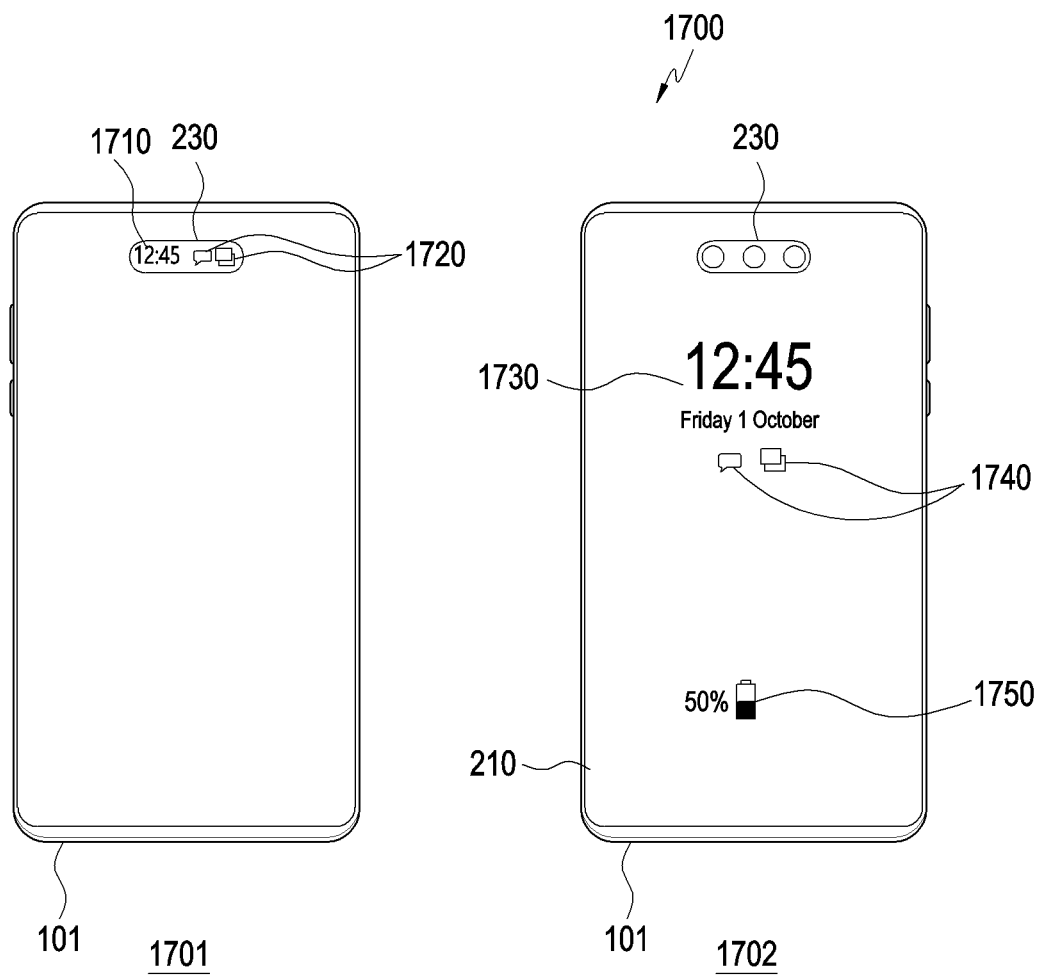

FIGS. 16 and 17 are exemplary diagrams 1600 and 1700 illustrating a method of displaying AOD information according to various embodiments.

Referring to FIGS. 15 and 16, in operation 1501, in an embodiment, the processor 920 may execute an always-on display (AOD) function.

In an embodiment, the AOD function may be a function of displaying specified information (e.g., date, time, notification, and/or remaining battery level) on a display module when an input for turning off the screen is received.

In an embodiment, if an input for executing the AOD function (e.g., an input for turning off the screen) is received in the state in which the AOD function is configured, the processor 920 may execute the AOD function.

In operation 1503, in an embodiment, the processor 920 may identify whether or not the second display 230 faces the first direction. For example, if the AOD function is executed, the processor 920 may identify the state in which the second display 230 faces in the first direction or the state in which the second display 230 faces in the second direction through the sensor module 260 (e.g., a Hall sensor).

If it is identified that the second display 230 faces in the first direction in operation 1503, in an embodiment, the processor 920 may display AOD information (corresponding to the AOD function) on the second display 230 in operation 1505. For example, as shown by reference numeral 1601 in FIG. 16, the processor 920 may display, on the second display 230, AOD information including the current time 1610 and a received notification 1620 while the first display 210 and the second display 230 are facing in the first direction. In an embodiment, when displaying the AOD information on the second display 230, the processor 920 may deactivate the first display 210 (e.g., turn off the first display 210).

In operation 1507, in an embodiment, the processor 920 may display the AOD information on the first display 210, based on a specified first input, while the AOD information is being displayed on the second display 230. For example, as shown in reference numeral 1601 in FIG. 16, the processor 920 may receive a user input onto the first display 210 (e.g., a touch input onto the first display 210), as a specified first input, while the AOD information including the current time 1610 and the received notification 1620 is being displayed on the second display 230. However, the specified first input is not limited to the user input onto the first display 210. For example, the specified first input may include an input to a physical key or a touch input onto the second display 230. If the specified first input is received, the processor 920 may deactivate the second display 230 (e.g., turn off the second display 230) and activate (e.g., turn on) the first display 210 as shown by reference numeral 1602 in FIG. 16, thereby displaying AOD information including the current time, date, and day 1630 and the notification 1640 (and a battery level 1650 displayed on a lock screen) in the area of the first display 210, which is greater than the area of the AOD information displayed on the second display 230.

If it is identified that the second display 230 faces in the second direction in operation 1503, in an embodiment, the processor 920 may display AOD information on the second display 230 in operation 1509. For example, as shown by reference numeral 1701 in FIG. 17, the processor 920 may display AOD information including the current time 1710 and a received notification 1720 on the second display 230 while the second display 230 faces in the second direction. In an embodiment, when displaying AOD information on the second display 230, the processor 920 may deactivate the first display 210 (e.g., turn off the first display 210).

In operation 1511, in an embodiment, the processor 920 may display AOD information on the first display 210, based on a specified second input, while the AOD information is being displayed on the second display 230. For example, as shown in reference numeral 1701 in FIG. 17, the processor 920 may receive, as a specified second input, an input for turning the electronic device 101 over so as to face in the opposite direction of the current direction (e.g., an input for rotating the electronic device 101 facing the direction by a specified angle (e.g., about 180 degrees)) while the AOD information including the current time 1710 and the received notification 1720 is being displayed on the second display 230. However, the specified second input is not limited to the aforementioned input. For example, the specified second input may include an input to a physical key or a touch input onto the second display 230. If the specified second input is received, as shown by reference numeral 1702 in FIG. 17, the processor 920 may deactivate the second display 230 (e.g., turn off the second display 230) and activate (e.g., turn on) the first display 210, thereby displaying AOD information including the current time, date, and day 1730 and the notification 1740 (and a battery level 1750 displayed on a lock screen) in the area of the first display 210, which is greater than the area of the AOD information displayed on the second display 230.

A method of operating an electronic device 101 according to various embodiments of the disclosure may include displaying an execution screen of an application on a first display 210 of the electronic device 101 and on a second display 230 included in a rotation module 220 of the electronic device 101 in a state in which the first display 210 and the second display 230 face in a first direction in which the first display 210 faces, based on a specified input, controlling a driving module 250 of the electronic device 101 such that a camera module 240, which is included in the rotation module 220 and faces in a direction opposite to a direction in which the second display 230 faces, faces in the first direction, and displaying, on the first display 210, an image obtained through the camera module 240 in a state in which the camera module 240 faces in the first direction.

In various embodiments, the displaying of the execution screen of the application on the first display 210 and the second display 230 may include displaying a first part of the execution screen on the first display 210 and displaying a second part of the execution screen on the second display 230 in the state in which the first display 210 and the second display 230 face in the first direction.

In various embodiments, the specified input may be an input for obtaining an image of a subject located in the first direction through the camera module 240.

In various embodiments, the method may further include displaying content related to the application on the second display 230 facing in a second direction opposite to the first direction in the state in which the camera module 240 faces in the first direction.

In various embodiments, the content related to the application may include an icon indicating the application and/or information indicating a function being executed through the application.

In various embodiments, the method may further include detecting a state of the electronic device 101 through a sensor module 260 of the electronic device 101, controlling the driving module 250 such that the second display 230 faces in a second direction opposite to the first direction, in a state in which the electronic device 101 is placed so that the front surface of the electronic device 101 faces an object and in which the second display 230 faces in the first direction, and displaying information including a current time and/or a notification on the second display 230.

In various embodiments, the method may further include identifying whether or not the second display 230 faces in the first direction through a sensor module 260 of the electronic device 101, based on an AOD function being executed, displaying information corresponding to the AOD function on the second display 230 based on the second display 230 facing in the first direction, and, based on an input touching the first display 210, deactivating the second display 230 and displaying information corresponding to the AOD function on the first display 210.

In various embodiments, the method may further include displaying information corresponding to the AOD function on the second display 230 based on the second display 230 facing in a second direction opposite to the first direction, and, based on an input for turning the electronic device 101 over, deactivating the second display 230 and displaying information corresponding to the AOD function on the first display 210.

In various embodiments, the controlling of the driving module 250 of the electronic device 101 may include controlling a driving motor 251 included in the driving module 250 such that a driving gear member 253 included in the driving module 250 linearly reciprocates by the rotational force of the driving motor 251 so that the camera module 240 faces in the first direction, based on the specified input, and as the driving gear member 253 linearly reciprocates, the rotation module 220 may be rotated.

In various embodiments, the driving gear member 253 may include a first driving gear member 254 configured to linearly reciprocate by the driving motor 251 and a second driving gear member 255 configured to move together with the first driving gear member 254 while the first driving gear member 254 is linearly reciprocating and coupled to the first driving gear member 254 so as to rotate, and the rotation module 220 connected to the second driving gear member 255 may rotate and move to linearly reciprocate in the first direction or in the second direction as an interference protrusion of the second driving gear member 255 moves while being in contact with a guide member 261 of the electronic device 101.

In addition, the structure of the data used in the above-described embodiments of the disclosure may be recorded in a computer-readable recording medium through various means. The computer-readable recording medium includes a storage medium such as a magnetic storage medium (e.g., ROM, a floppy disk, a hard disk, etc.) and an optically readable medium (e.g., CD-ROM, DVD, etc.).

What is claimed is:

1. An electronic device comprising:
   a first display;
   a rotation module comprising a second display and a camera module,
   the camera module including a first pinion gear includes at least one lens and at least one image sensor, wherein the camera module faces in a direction opposite to a direction in which the second display faces;
   a driving module including a driving motor including a second pinion gear, and a driving gear member, wherein a first end of the driving gear member is configured to engage with the first pinion gear, and a second end of the driving gear member is configured to engage with the second pinion gear, the driving module configured to rotate the rotation module such that the second display faces in a first direction in which the first display faces or in a second direction opposite to the first direction; and
   at least one processor, comprising processing circuitry, configured to:
   display an execution screen of an application on the first display and the second display in a state in which the first display and the second display face in the first direction,
   based on a specified input, control the driving module such that a rotational force of the second pinion gear of the driving motor rotates counterclockwise along an X-axis to linearly move the driving gear member along a Y-axis, and that movement of the Y-axis of the driving gear member rotates the first pinion gear of the camera module such that the camera module faces in the first direction, and
   display, on the first display, an image obtained through the at least one image sensor of the camera module in a state in which the camera module faces in the first direction,
   wherein the rotational force rotating along the X-axis is transmitted to the rotation module from the driving module.

2. The electronic device of claim 1, wherein the at least one processor is configured to display a first part of the execution screen on the first display and to display a second part of the execution screen on the second display in the state in which the first display and the second display both face in the first direction.

3. The electronic device of claim 1, wherein the specified input comprises an input for obtaining an image of a subject located in the first direction through the camera module.

4. The electronic device of claim 1, wherein the at least one processor is configured to display content related to the application on the second display facing in the second direction in the state in which the camera module faces in the first direction.

5. The electronic device of claim 4, wherein the content related to the application comprises an icon indicating the application and/or information indicating a function being executed through the application.

6. A method of operating an electronic device, the method comprising:
   displaying an execution screen of an application on a first display of the electronic device and on a second display included in a rotation module of the electronic device in a state in which the first display and the second display face in a first direction in which the first display faces;

based on a specified input, controlling a driving module of the electronic device such that a rotational force of a second pinion gear of a driving motor rotates counter-clockwise along an X-axis to linearly move a driving gear member along a Y-axis, and that movement of the Y-axis of the driving gear member rotates a first pinion gear of a camera module such that the camera module, which is included in the rotation module and faces in a direction opposite to a direction in which the second display faces, faces in the first direction; and displaying, on the first display, an image obtained through at least one image sensor of the camera module in a state in which the camera module faces in the first direction, wherein the camera module including the first pinion gear includes at least one lens and the at least one image sensor, wherein the driving module includes the driving motor including the second pinion gear and the driving gear member, wherein a first end of the driving gear member engages with the first pinion gear, and a second end of the driving gear member engages with the second pinion gear, and wherein the rotational force rotating along the X-axis is transmitted to the rotation module form the driving module.

7. The method of claim 6, the displaying of the execution screen of the application on the first display and the second display comprises displaying a first part of the execution screen on the first display and displaying a second part of the execution screen on the second display in the state in which the first display and the second display face in the first direction.

8. The method of claim 6, wherein the specified input comprises an input for obtaining an image of a subject located in the first direction through the camera module.

9. The method of claim 6, further comprising displaying content related to the application on the second display facing in a second direction opposite to the first direction in the state in which the camera module faces in the first direction.

10. The method of claim 9, wherein the content related to the application comprises an icon indicating the application and/or information indicating a function being executed through the application.

* * * * *